(12) United States Patent
Tsui

(10) Patent No.: US 8,624,848 B2
(45) Date of Patent: Jan. 7, 2014

(54) ELECTRONIC DEVICE AND AUTOMATICALLY HIDING KEYPAD METHOD AND DIGITAL DATA STORAGE MEDIA

(75) Inventor: Yuan-Mao Tsui, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 712 days.

(21) Appl. No.: 12/397,485

(22) Filed: Mar. 4, 2009

(65) Prior Publication Data

US 2009/0267910 A1    Oct. 29, 2009

(30) Foreign Application Priority Data

Apr. 24, 2008    (TW) ............................... 97115067 A

(51) Int. Cl.
*G06F 3/041*    (2006.01)
*G06F 3/048*    (2013.01)

(52) U.S. Cl.
USPC .......................................... 345/173; 715/773

(58) Field of Classification Search
USPC ........... 345/173; 715/811, 816, 830, 840, 841
See application file for complete search history.

(56) References Cited

U.S. PATENT DOCUMENTS

| | | | |
|---|---|---|---|
| 5,784,060 A | 7/1998 | Bertram et al. | |
| 5,818,437 A | 10/1998 | Grover et al. | |
| 6,957,397 B1 * | 10/2005 | Hawkins et al. | 715/856 |
| 7,411,582 B2 * | 8/2008 | Toepke et al. | 345/173 |
| 2005/0210402 A1 | 9/2005 | Gunn et al. | |
| 2007/0040813 A1 * | 2/2007 | Kushler et al. | 345/173 |
| 2008/0055263 A1 * | 3/2008 | Lemay et al. | 345/173 |
| 2008/0122796 A1 * | 5/2008 | Jobs et al. | 345/173 |
| 2008/0186283 A1 * | 8/2008 | Kim et al. | 345/173 |
| 2009/0079702 A1 * | 3/2009 | Colley | 345/173 |

FOREIGN PATENT DOCUMENTS

| | | |
|---|---|---|
| CN | 101031119 | 9/2007 |
| EP | 1 954 015 | 8/2008 |
| GB | 2 306 078 | 4/1997 |
| TW | 200741525 A | 11/2007 |

OTHER PUBLICATIONS

English language translation of abstract of CN 101031119 (published Sep. 5, 2007).
TW Office Action dated Mar. 28, 2013.
English Abstract translation of KR20090012030 (Published Feb. 2, 2009, claiming priority to TW20070127430).

* cited by examiner

*Primary Examiner* — Nicholas Lee
(74) *Attorney, Agent, or Firm* — McClure, Qualey & Rodack, LLP

(57) ABSTRACT

A method for automatically hiding keypad, an electronic device, and a digital data storage medium are provided. The keypad automatically hiding method is applied to an electronic device having a touch screen. The method includes the following steps. Firstly, an input field and a keypad are shown on the touch screen. Next, an item of data is received from the keypad and inputted to the input field. Then, a search list is shown on the touch screen according to the data. Afterwards, the keypad is hidden when the input signal for checking the search list is generated.

18 Claims, 3 Drawing Sheets

ELECTRONIC DEVICE AND AUTOMATICALLY HIDING KEYPAD METHOD AND DIGITAL DATA STORAGE MEDIA

This application claims the benefit of Taiwan application Serial No. 97115067, filed Apr. 24, 2008, the subject matter of which is incorporated herein by reference.

BACKGROUND OF THE APPLICATION

Touch screen enables the user to input a command by touching the elements on the screen directly. Touch screen provides users with great convenience in use and has gains great popularity. In order to meet the requirement of miniaturization, portable electronic device normally has a small size, the size of touch screen is relatively reduced.

Let the mobile phones with touch screen currently available on the market be taken for example. In a dialing mode, when the user inputs a number by pressing a dialing keypad shown on the touch screen of the portable electronic device, the records matching the inputted number are shown on the touch screen. For example, when the user inputs the number "0920", the records of telephone numbers in a contact list and/or in a call history that match "0920" will be shown on the touch screen.

As the size of touch screen is reduced, only a few records can be shown on the touch screen if a dialing keypad is concurrently shown on the touch screen. For example, usually only two records can be shown on the touch screen in a mobile phone. Under such circumstances, the user has to drag down a scroll bar or presses a down-shift key or has to manually activate a press key to close the dialing keypad if the user would like to view other records covered by the dialing keypad. Thus, the efficiency of viewing these records is decreased and the inconvenience in use worsens.

SUMMARY OF THE APPLICATION

The application is directed to an electronic device, a method for automatically hiding keypad, and a digital data storage medium. The keypad is hidden when the input signal for checking the search list is generated. Thus, the available area on the touch screen for showing the search list is increased, such that the user can view more records of the search list shown on the touch screen.

According to a first aspect of the present application, an electronic device comprising a touch screen and a processing unit is provided. The touch screen is used for showing an input field, a search list, and a keypad, wherein an item of data is received from the keypad and inputted to the input field, and the search list is generated according to the data. The processing unit is coupled to the touch screen. The processing unit hides the keypad when an input signal for checking the search list is generated.

According to a second aspect of the present application, a method for automatically hiding keypad is provided. The method for automatically hiding keypad is applied to an electronic device having a touch screen. The method comprises the following steps. Firstly, an input field and a keypad are shown on the touch screen. Next, an item of data is received from the keypad and inputted to the input field. Then, a search list is shown on the touch screen according to the data. Afterwards, the keypad is hidden when the input signal for checking the search list is generated.

According to a third aspect of the present application, a digital data storage medium is provided. The digital data storage medium has many commands executable on an electronic device, and the electronic device executes a keypad automatically hiding method after having executed these commands. The method comprises the following steps. Firstly, an input field and a keypad are shown on a touch screen of the electronic device. Next, an item of data is received from the keypad and inputted to the input field. Then, a search list is shown on the touch screen according to the data. Afterwards, the keypad is hidden when the input signal for checking the search list is generated.

The application will become apparent from the following detailed description of the preferred but non-limiting embodiments. The following description is made with reference to the accompanying drawings.

DETAILED DESCRIPTION OF THE APPLICATION

Figure 1:
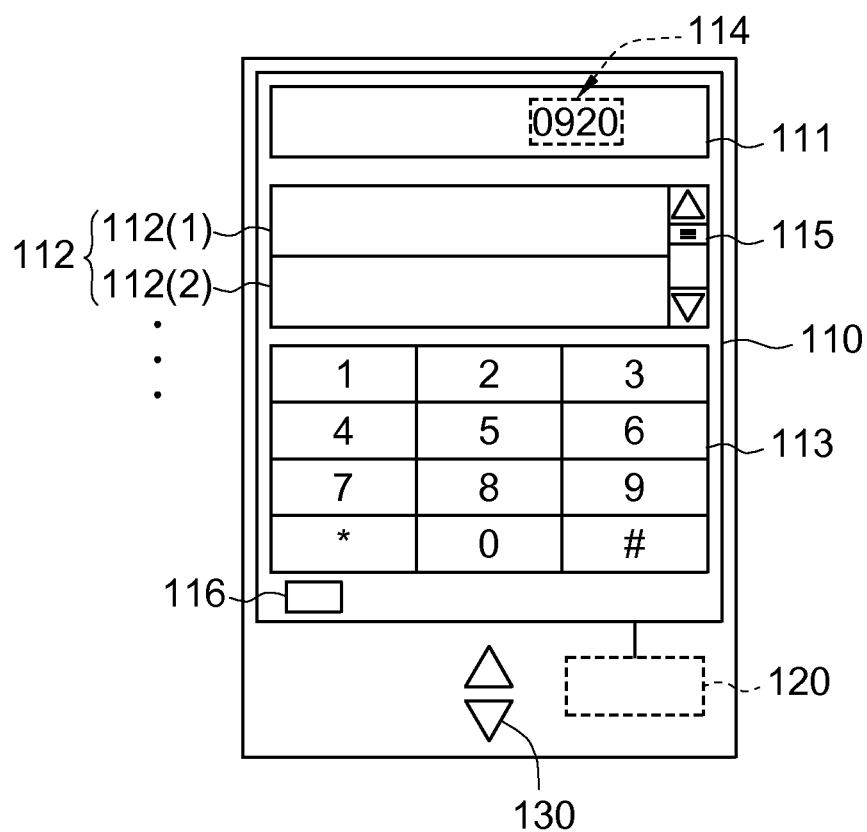
FIG. 1 shows a perspective of an electronic device according to a preferred embodiment of the application.
Figure 2:
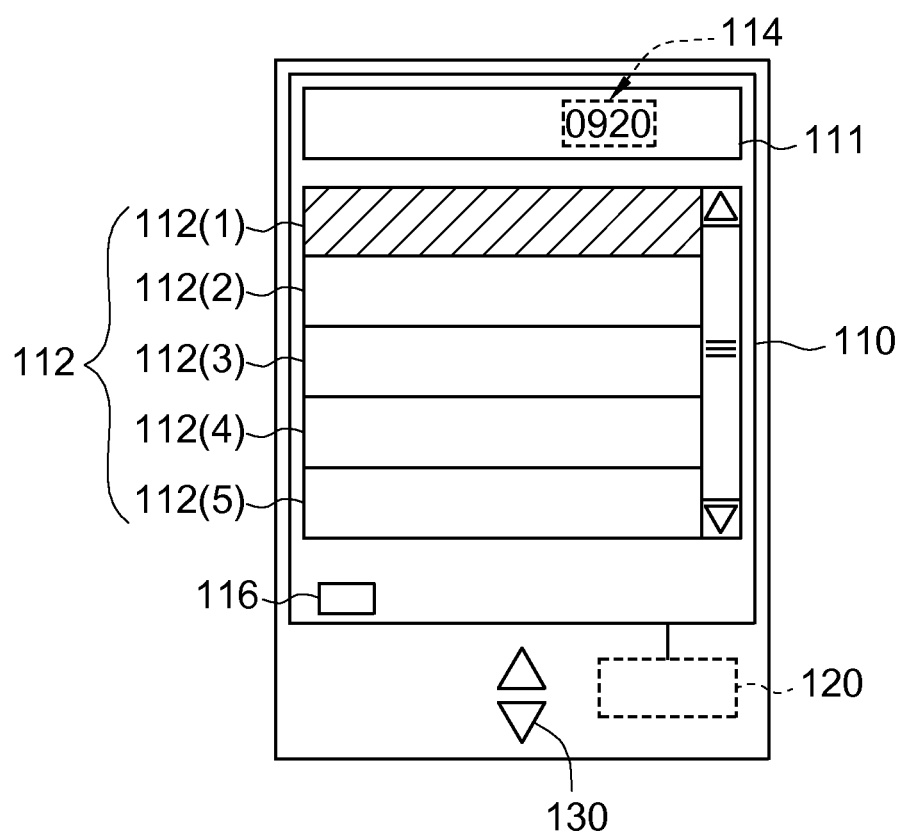
FIG. 2 simulates the keypad of FIG. 1 being hidden.

Referring to both FIG. 1 and FIG. 2. FIG. 1 shows a perspective of an electronic device 100 according to a preferred embodiment of the application. FIG. 2 simulates the keypad 113 of FIG. 1 being hidden. The electronic device 100, such as a touch phone or a personal digital assistant (PDA) phone, comprises a touch screen 110 and a processing unit 120. The touch screen 110 of the electronic device 100 is used for showing an input field 111, a search list 112, and a keypad 113 under a dialing mode. The keypad 113 is used for inputting an item of data Dt to the input field 111. The search list 112 generated according to the data Dt has m records. In the present embodiment of the application, when the user inputs a number or characters, the telephone number or the contact name in the contact list and/or the call history matching with the inputted number and or the inputted characters is searched so as to generate a search list 112. In the present embodiment of the application, m is exemplified by 5, and the search list 112 has 5 records, namely records 112(1)~112(5).

As shown in FIG. 1, when the input field 111, the search list 112, and the keypad 113 are shown on the touch screen 110 at the same time, the user can only view n records of the search list 112 on the touch screen 110, wherein n is a positive integer smaller than m. For example, the user only can view 2 records (n=2), namely records 112(1) and 112(2). By dragging down a scroll bar 115 or using a down-shift key (not illustrated), the user can one by one view other records such as records 112(3)~112(5) as illustrated in FIG. 2. Or, the user needs to touch a software or a hardware key (not illustrated) to close the keypad 113 in order to view more records such as records 112(3)~112(5). However, the above mentioned manners for viewing the records provide low efficiency and increase inconvenience to the user.

A keypad automatically hiding method, an electronic device, and a digital data storage medium are provide in the application to resolve the above problems. The processing unit 120 is coupled to the touch screen 110. Meanwhile, the processing unit 120 hides the keypad 113 as shown in FIG. 2 when an input signal for checking the search list 112, which implies that the user would like to check the data of the search list 112, is generated. The processing unit 120 hides the keypad 113 by controlling the keypad 113 to fly out from the bottom of the touch screen 110. Thus, the available area on the touch screen 110 for showing the search list 112 is increased, so that the user can view more records on the touch screen 110. For example, the user can view records 112(1)~112(5) at the same time, hence increasing the efficiency of viewing the records and improving the convenience in use.

In the present embodiment of the application, the keypad 113 is a number keypad or an alphabetical keypad for example. Besides, the data Dt is an inputted string 114. The inputted string 114, for example, is a telephone number or a contact name inputted by the user by pressing the number keypad, an alphabetical keypad, or a keypad combining a number keypad and an alphabetical. The records 112(1)~112(5) are generated according to the inputted string 114. For example, if the inputted telephone number is "0920," the records are any telephone numbers in a contact list and/or a call history of the electronic device 100 that match "0920." For example, if the inputted contact name is "chen," the records are any contact names in a contact list and/or a call history of the electronic device 100 that match "chen."

Furthermore, when the input signal is generated in one of the records 112(1)~112(5) and is used for checking one of the records 112(1)~112(5), the processing unit 120 hides the keypad 113. However, in other embodiments, the processing unit 120 hides the keypad 113 when the input signal for checking record is generated in a record which is not shown on the current screen unless the user drags down the scroll bar 115 or presses a down-shift key. As shown in FIG. 1, the touch screen 110 shows the input field 111, the 1st to the n-th record (n=2), and the keypad 113. The processing unit 120 hides the keypad 113 when the input signal is generated in the n-th record and is moved to the (n+1)-th record (n+1=3). That is, the processing unit 120 hides the keypad 113 when the input signal is generated in the record 112(2) and moved to the record 112(3).

Furthermore, the processing unit 120 shows the keypad 113 again when an input signal for leaving the search list 112, which implies that the user does not need to check the search list 112, is generated. For example, when the input signal is generated in the last one record 112(5) and is a downward signal by pressing a down-arrow navigation key 130, the processing unit 120 shows the keypad 113 and the input signal is moved to the input filed 111.

The user can generate the input signal by utilizing a navigation key 130 for example. In an embodiment of the application, the input signal can be circulatingly generated between the input field 111 and the records 112(1)~112(5) of the search list 112. The processing unit 120 shows the keypad 113 on the touch screen 110 accordingly when the input signal is generated in the input field 111, which implies that the user would like to input data to the input field 111 by utilizing the keypad 113. For example, when the input signal is generated in the 1st record 112(1) and is an upward signal by pressing an up-arrow navigation key 130, processing unit 120 shows the keypad 113 and the input signal is moved to the input field 111.

In an embodiment of the application, when the input signal is moved to a record of the search list 112, the background color of the current record is different from that of other records.

Moreover, in an embodiment of the application, the touch screen 110 is further used for showing a keypad access key 116. When the keypad access key 116 is activated, the processing unit 120 shows the keypad 113 on the touch screen 110. Thus, the user can instantly show the keypad 113 by pressing the keypad access key 116.

Figure 3:
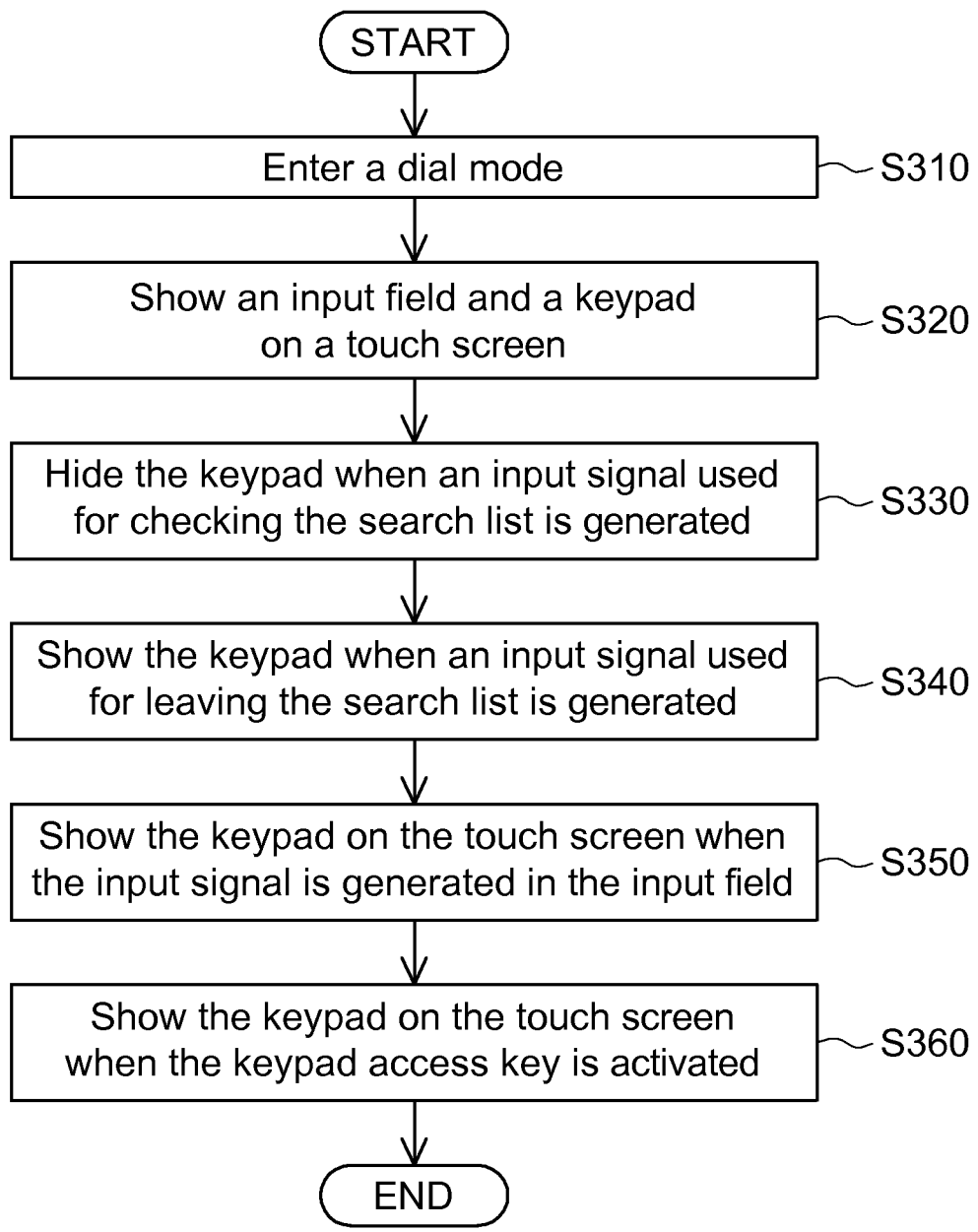
FIG. 3 shows a flowchart of a keypad automatically hiding method according to a preferred embodiment of the application.

FIG. 3 shows a flowchart of a method for automatically hiding keypad according to an embodiment of the application. In the present embodiment of the application, the method for automatically hiding keypad uses the electronic device 100 to execute the steps of FIG. 3, but the application is not limited thereto. Anyone who is skilled in the technology of the application will understand that the steps of the method for automatically hiding keypad and the order thereof can be modified or adjusted according to actual needs.

Firstly, the method begins at step S310, the electronic device enters a dialing mode. Next, as indicated in step S320, an input field 111 and a keypad 113 are shown on a touch screen 110. Next, an item of data Dt is received from the keypad 113 and inputted to the input field 111. The input field 111 has an inputted string 114. A search list 112 having five records 112(1)~112(5) is shown on the touch screen 110 according to the inputted string 114.

Then, the method proceeds to step S330, the processing unit 120 hides the keypad 113 when an input signal for checking the search list 112 is generated. In step S330, the processing unit 120 hides the keypad 113 when the input signal is generated in one of the records 112(1) 112(5). However, the processing unit 120 can hide the keypad 113 only when the input signal is generated in the record 112(2) and moved to the record 112(3).

Furthermore, the method proceeds to step S340, the processing unit 120 shows the keypad 113 again when an input signal for leaving the search list 112, which implies that the user does not need to check the search list 112, is generated.

Next, the method proceeds to step S350, the processing unit 120 shows the keypad 113 on the touch screen 110 when the input signal is generated in the input field 111, which implies that the user needs to input data again. For example, the input signal is a signal for leaving the search list 112 generated in the input field 111. In step S350, the processing unit 120 shows the keypad 113 on the touch screen 110 when the input signal is a downward signal generated in the last record 112(5). Furthermore, the processing unit 120 can also show the keypad 113 on the touch screen 110 when the input signal is an upward signal generated in the 1st record 112(1).

Or, the method proceeds to step S360, the keypad 113 is shown on the touch screen 110 when the keypad access key 116 is activated.

The method for automatically hiding keypad can be compiled into programming codes and stored in a digital data storage medium executable on the electronic device 100. The digital data storage medium, for example, is a secure digital (SD) card, a memory stick (MS) or a multimedia card (MMC), and has the above function of automatically hiding the keypad when executed on the electronic device 100.

An electronic device, method for automatically hiding keypad, and a digital data storage medium are disclosed in above embodiments of the application. The processing unit hides the keypad shown on the touch screen when an input signal for checking the search list, which implies that the user would like to check the data of the search list, is generated, such as the telephone number or the contact name of the contact list and/or the call history. The keypad can be hidden when the input signal is generated in one of the many records of the search list or when the input signal is generated in a record that cannot be viewed unless the scroll bar is dragged down or the down-shift key is pressed. When the keypad is hidden, the available area on the touch screen for showing the search list is increased, and more records, such as telephone numbers and contact names, can be shown on the touch screen at the same time. Thus, the efficiency of viewing the records is increased and user's convenience in use is improved, and the user gains better experience in use and the product competitiveness is increased. Furthermore, when the user does not find any useful telephone number or contact in the search list and would like to input a new item of inputted data, the input signal is generated in the input field and the keypad is shown on the touch screen to facilitate the user to input new item to the input field by utilizing the keypad. Also, the user can activate a keypad access key to show the keypad on the touch screen.

While the application has been described by way of example and in terms of a preferred embodiment, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
    a touch screen used for showing an input field, a search list, and a keypad, wherein the keypad is used for inputting data to the input field, and the search list is generated according to the data; and
    a processing unit coupled to the touch screen;
    wherein the inputted data is an inputted string, the search list comprises m records, m is a positive integer; and
    wherein the processing unit controls the touch screen to show the input field, a 1st record to a n-th record of the m records, and the keypad at the same time when a first input signal for inputting the data in the input field is generated, and n is a positive integer which is smaller than m; and
    wherein the processing unit controls the touch screen to hide the keypad and enlarge the area of the search list, when the touch screen shows the keypad and shows only 1st record to the n-th record of the m records and a second input signal for checking a (n+1)-th record is detected within the area of the 1st record to the n-th record.

2. The electronic device according to claim 1, wherein the processing unit controls the touch screen to show the keypad when the keypad is hidden, the search list is shown, and a third input signal for leaving the search list is generated.

3. The electronic device according to claim 1, wherein the electronic device has a dialing mode on which the input field, the search list, and the keypad are shown.

4. The electronic device according to claim 1, wherein the processing unit controls the touch screen to show the keypad on the touch screen when the keypad is hidden, the search list is shown, and a fifth input signal which is an upward signal and detected within the area of the 1st record is received.

5. The electronic device according to claim 1, wherein the processing unit controls the touch screen to show the keypad on the touch screen when the keypad is hidden, the search list is shown, and a sixth input signal which is a downward signal and detected within the area of the m-th record is received.

6. The electronic device according to claim 1, wherein the touch screen is further used for showing a keypad access key, and the processing unit controls the touch screen to show the keypad on the touch screen when the keypad's access key is activated.

7. A method for automatically hiding keypad, applied to an electronic device having a touch screen, wherein the method comprises:
    showing an input field and a keypad on the touch screen;
    receiving data from the keypad and inputting the data to the input field, wherein the inputted data is an inputted string, the search list comprises m records, and m is a positive integer;
    showing a search list on the touch screen according to the data; and
    hiding the keypad and enlarging the area of the search list;
    wherein in the step of showing the input field and the keypad on the touch screen, the input field, a 1st record to a n-th record of the m records and the keypad are shown at the same time when a first input signal for inputting the data in the input field is detected within the area of the 1st record to the n-th record, and n is a positive integer smaller than m;
    in the step of hiding the keypad and enlarging the area of the search list, the keypad is hidden and the area of the search list is enlarged when the keypad is shown, only the 1st to the n-th record of the m records are shown, and a second input signal for checking a (n+1)-th record is detected within the area of the 1st record to the n-th record.

8. The method according to claim 7, further comprises:
    showing the keypad when a third input signal for leaving the search list is generated.

9. The method according to claim 7, further comprises:
    showing the keypad on the touch screen when a third input signal which is an upward signal and detected within the area of the 1st record is received.

10. The method according to claim 7, further comprises:
    showing the keypad on the touch screen when a fourth input signal which is a downward signal and detected within the area of the m-th record is received.

11. The method according to claim 7, wherein the touch screen comprises a keypad access key, and the method further comprises:
    showing the keypad on the touch screen when the keypad access key is activated.

12. A non-transitory recording medium, recording program instructions to be executed by a processor to perform the keypad automatically hiding method according to claim 7.

13. An electronic device, comprising:
    a touch screen used for showing an input field, a search list, a keypad and a keypad access key, wherein the keypad is used for inputting data to the input field, and the search list is generated according to the data; and
    a processing unit coupled to the touch screen;
    wherein the processing unit simultaneously controls the touch screen to hide the keypad and enlarge the area of the search list, when the keypad is shown and the touch screen receives a first touch input signal which is an upward signal or a downward signal and is generated, in the area of the search list, for operating the search list; and
    the processing unit controls the touch screen to show the keypad on the touch screen, when the keypad is hidden and the keypad access key is activated.

14. A method for automatically hiding keypad, applied to an electronic device having a touch screen, wherein the method comprises:
    showing an input field, a keypad and a keypad access key on the touch screen;
    receiving data from the keypad and inputting the data to the input field;
    showing a search list on the touch screen according to the data;
    simultaneously hiding the keypad and enlarging the area of search list, when the keypad is shown and a first touch input signal for operating the search list is generated, wherein the first touch input signal, which is an upward signal or a downward signal, is detected within the area of the search list; and showing the keypad on the touch screen, when the keypad is hidden and the keypad access key is activated.

15. The electronic device according to claim 1, wherein the processing unit controls the touch screen to show the keypad on the touch screen when the keypad is hidden, the search list is shown and a seventh input signal which is a touch signal detected within the area of the input field.

16. The method according to claim 7, further comprises:
showing the keypad on the touch screen when a seventh input signal which is detected within the area of the input field is received.

17. The electronic device according to claim 13, wherein the processing unit controls the touch screen to show the keypad on the touch screen when the keypad is hidden, the search list is shown and a second touch input signal which is a touch signal detected within the area of the input field.

18. The method according to claim 14, further comprises:
showing the keypad on the touch screen when a second touch input signal which is detected within the area of the input field is received.

\* \* \* \* \*